(12) United States Patent
Hong et al.

(10) Patent No.: US 7,574,127 B2
(45) Date of Patent: Aug. 11, 2009

(54) AUTO-FOCUSING CAMERA

(75) Inventors: Chien-Long Hong, Taipei Hsien (TW); Ching-Hsing Huang, Taipei Hsien (TW); Jen-Hung Chung, Taipei Hsien (TW); Huai-Chao You, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 291 days.

(21) Appl. No.: 11/617,099

(22) Filed: Dec. 28, 2006

(65) Prior Publication Data
US 2008/0159729 A1 Jul. 3, 2008

(51) Int. Cl.
*G03B 13/34* (2006.01)
(52) U.S. Cl. .................................................... 396/133
(58) Field of Classification Search ................. 396/133, 396/85, 811; 359/813, 819, 829
See application file for complete search history.

(56) References Cited
U.S. PATENT DOCUMENTS

| | | | |
|---|---|---|---|
| 6,359,652 B1 * | 3/2002 | Takada | 348/374 |
| 7,039,309 B2 | 5/2006 | Hsiao | |
| 7,422,382 B2 * | 9/2008 | Seo | 396/529 |
| 7,430,368 B2 * | 9/2008 | Lee | 396/76 |
| 2006/0204242 A1 * | 9/2006 | Gutierrez et al. | 396/439 |
| 2007/0014566 A1 * | 1/2007 | Sobajima et al. | 396/330 |
| 2008/0085109 A1 * | 4/2008 | Hsiao et al. | 396/133 |
| 2008/0095524 A1 * | 4/2008 | Hsiao et al. | 396/133 |
| 2008/0118240 A1 * | 5/2008 | Hong et al. | 396/133 |

* cited by examiner

*Primary Examiner*—W. B. Perkey
*Assistant Examiner*—Noam Reisner
(74) *Attorney, Agent, or Firm*—Frank R. Niranjan

(57) ABSTRACT

An auto focusing camera includes a square-shaped circuit board (11), a motor (100) arranged on the circuit board, and a lens unit (20) received in the motor. The circuit board forms contacts (114) on corners thereof. The motor includes a cuboid-shaped housing (18), a stator (12) mounted in the housing, and a rotor (14) being rotatably disposed in the stator. The stator includes a square-shaped base (123) forming connecting pins (139) in corners thereof, and a stator core (121) with coils (122) wound thereon. The coils have ends being electrically connected with the connecting pins of the base. The connecting pins are electrically connected with the contacts in the housing to electrically connect the ends of the coils to the circuit board.

11 Claims, 6 Drawing Sheets

AUTO-FOCUSING CAMERA

BACKGROUND OF THE INVENTION

1. Field of the Invention

The present invention relates generally to a lens drive mechanism of an auto-focusing camera, and more particularly to a drive mechanism of an auto-focusing camera with a built-in lens.

2. Description of Related Art

Conventionally, an auto-focus structure is used for controlling the telescopic movement of a lens of the camera. The auto-focus structure is used to automatically produce high-quality images with minimum user's effort, and as such is an important part of a modern digital camera.

The auto-focus structure of the camera focuses on an object by analyzing the image on an image sensor which is controlled by a central processing unit (CPU) installed inside the digital camera. The auto-focus structure operates by moving the lens back and forth around its original (static) position. As the lens moves, the CPU compares the image from the lens with the image in the image sensor. Finally, as the lens moves to the position where the image is fully in focus, the lens then stops in that position. In this case, the lens has to be continuously driven back and forth by a motor. Generally the motor is column-shaped, including a stator having a stator core and coils wound around the stator core and a permanent magnet mounted around the lens. During operation of the motor, a current is applied to the coils to establish an alternating magnetic field. The magnetic field of the permanent magnet interacts with the alternating magnetic field of the stator to drive the lens to move. At the moment when the CPU detects a focused image as the lens moves back and forth, a stop signal is simultaneously sent to the motor. Therefore, the lens stops at the best focal position (static position).

A pin holder is for connecting the coils with a power source to provide the current to the coils to drive the motor into operation. The pin holder is formed on a side of the motor. A plurality of pins are received in the pin holder and connect with ends of the coils to electrically connect the ends of the coils to the power source. However, the pins are formed on a cylindrical housing of the motor which constitutes the column shape of the motor, and a circuit board for applying currents to the coils is usually arranged under the motor. Wiring is needed to electrically connect the ends of the coils to the circuit board, which causes production and assembly of the motor to be costly and awkward.

SUMMARY OF THE INVENTION

According to a preferred embodiment of the present invention, an auto focusing camera includes a square-shaped circuit board, a motor arranged on the circuit board, and a lens unit being linearly movably received in the motor. The circuit board forms contacts on corners thereof. The motor includes a cuboid-shaped housing, a stator mounted in the housing, and a rotor being rotatably disposed in the stator. The rotor forms an inner thread on an inner surface thereof. The lens unit is linearly movably received in the rotor and forms an outer thread engaging with the inner thread of the rotor. The stator includes a square-shaped base forming connecting pins in corners thereof, and a stator core with coils wound thereon. The coils have ends being electrically connected with the connecting pins of the base. The connecting pins are electrically connected with the contacts of the circuit board to electrically connect the ends of the coils to the circuit board, when the motor is mounted on the circuit board. The contacts and the connecting pins are located within the housing.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
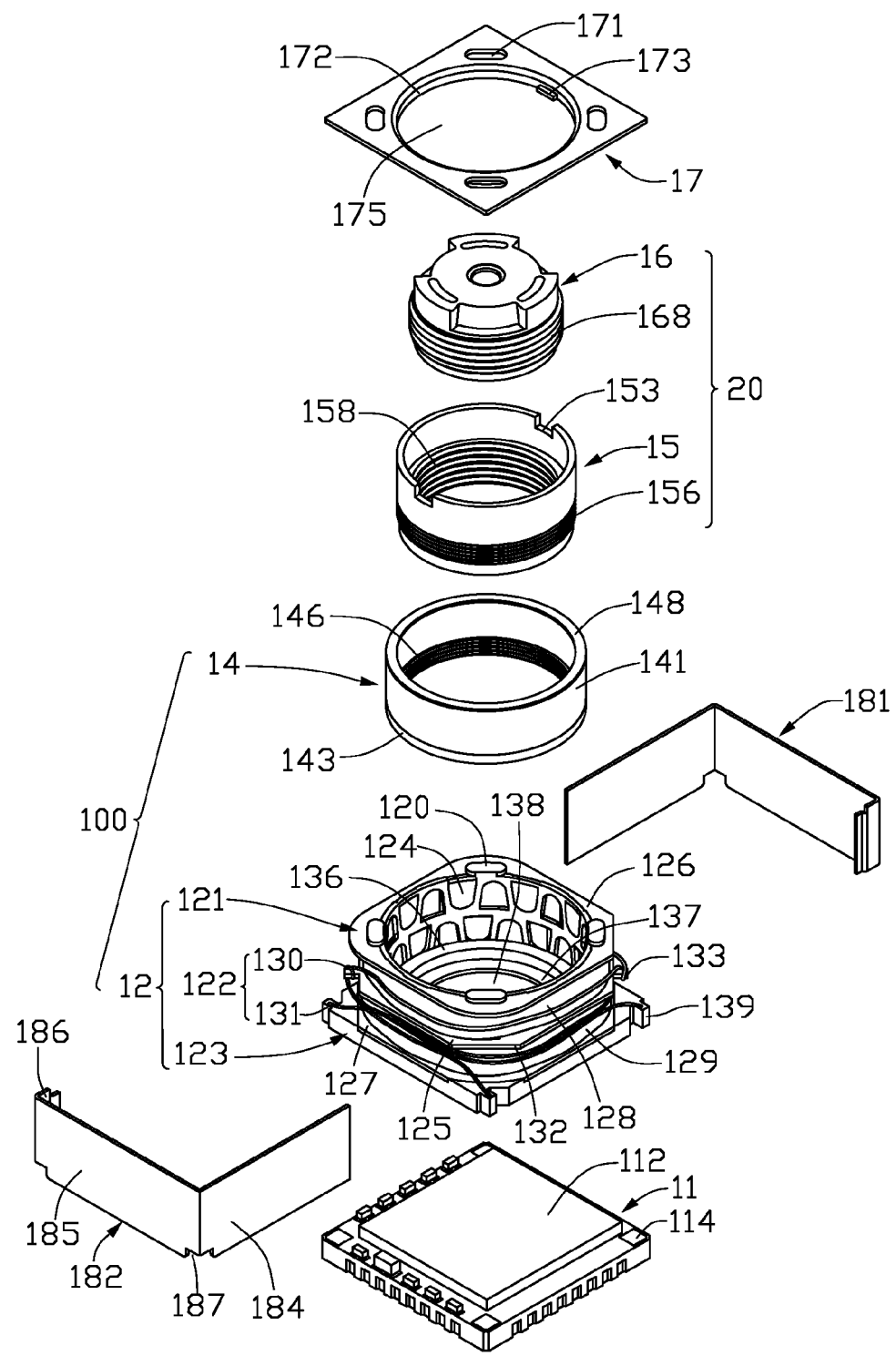
FIG. 1 is an isometric, exploded view of an auto-focusing camera in accordance with a preferred embodiment of the present invention.
Figure 2:
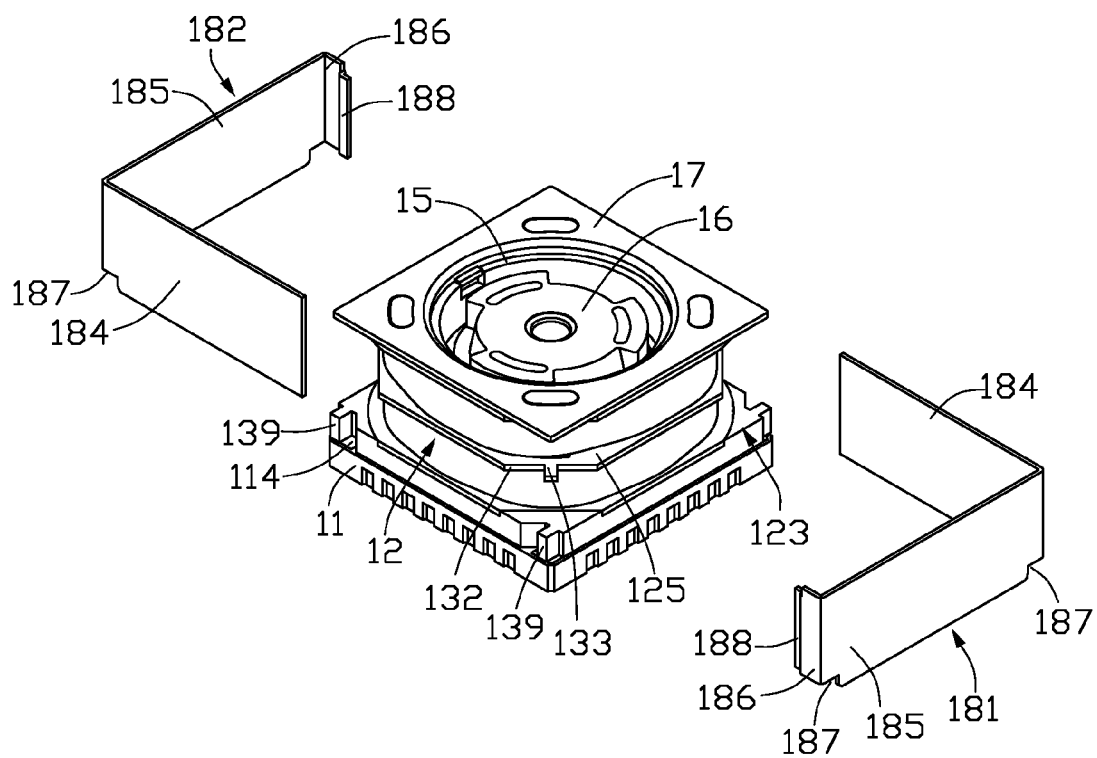
FIG. 2 is a partially assembled view of FIG. 1, with coils of the auto-focusing camera being removed for clarity.
Figure 3:
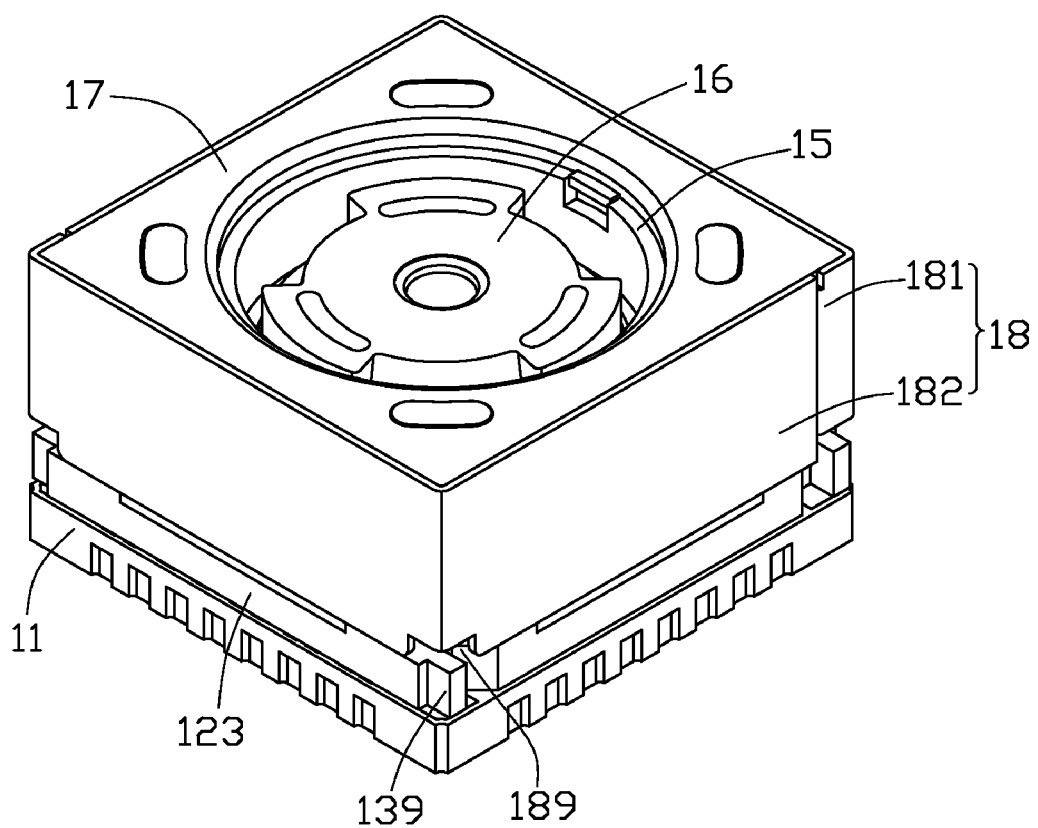
FIG. 3 is a fully assembled view of FIG. 1, with the coils of the auto-focusing camera being removed for clarity.

Referring to FIGS. 1-3, an auto-focusing camera in accordance with a preferred embodiment of the present invention includes a circuit board 11, a motor 100 arranged on the circuit board 11, and a lens unit 20 received in the motor 100. The circuit board 11 is square-shaped, and forms a contact 114 in each of four corners thereof. An image sensor 112 is arranged on a central portion of the circuit board 11. The image sensor 112 is either a charge coupled device (CCD) sensor or a complementary metal oxide semiconductor (CMOS) sensor, which is used in conjunction with a color separation device and signal processing circuitry to record electronic images.

The motor 100 includes a housing 18, a stator 12 received in the housing 18, and a rotor 14 disposed in the stator 12. The housing 18 is a hollow cube with top and bottom ends being opened. Each of the four corners of a bottom end of the housing 18 defines a cutout 187 therein. The housing 18 is arranged on an outer periphery of the circuit board 11. The contacts 114 of the circuit board 11 are received in the housing 18 and are located corresponding to the four corners of the housing 18. The housing 18 includes two parts 181, 182 facing each other. Each part 181, 182 includes first and second sidewalls 184, 185 perpendicular to each other, and a narrow lateral 186 extending perpendicularly from the second sidewall 185. When the two parts 181, 182 are assembled together, the lateral 186 of each part 181, 182 overlaps the first sidewall 184 of the other part 182, 181, and is fixedly connected therewith by laser soldering. Thus the two parts 181, 182 are assembled together to form the housing 18. Alternatively, the two parts 181, 182 of the housing 18 can lock with each other to assemble together; for example, one of the two parts 181, 182 defines an aperture therein, and the other part 182, 181 form a protrusion engaging into the aperture. Also locking devices, such as rivets can be used to lock the two parts 181, 182 together.

The stator 12 includes a base 123, and a stator core 121 with two coils 122 wound thereon being arranged on the base 123. The base 123 is square-shaped and has a size approximately the same as an inner size of the housing 18. An opening 138 is defined in a central portion of the base 123 corresponding to the image sensor 112. An annular bracket 134 (also see FIG. 5) is formed on an inner periphery of the base 123 around the opening 138. The bracket 134 extends inwardly and radially from a middle of an inner circumference of the base 123. A height of the bracket 134 is lower than that of the base 123. A top surface of the bracket 134 is lower than that of the base 123, and a bottom surface of the bracket 134 is higher than that of the base 123. An annular flange 136 extends upwardly from a middle of the top surface of the bracket 134. Thus the bracket 134 is divided into an annular inner portion 137, an annular middle portion consisting of the annular flange 136 and an annular outer portion 135. Each corner of the base 123 defines a slot (not labeled) therein. A connecting pin 139 extending from each corner of the base 123 is received in a corresponding slot. The connecting pins 139 are integrally formed with the bracket 134. A conducting layer made of conducting materials, such as metal, is coated on each of the connecting pins 139.

The stator core 121 is cylindrical-shaped and hollow. The stator core 121 is arranged on the outer portion 135 of the bracket 134 of the base 123. An outer diameter of the stator core 121 is approximately the same as an inner diameter of the base 123. And an inner diameter of the stator core 121 is approximately the same as an outer diameter of the lens unit 20. The stator core 121 has a plurality of poles 124 intermeshed with each other to form a cylinder for the coils 122 wound thereon. Three square-shaped flanges 126, 125, 127 extend outwardly from a top, a middle, and a bottom of a periphery of the cylindrical-shaped stator core 121, respectively. The middle and bottom flanges 125, 127 respectively form four notches 132 in four corners thereof. A pair of guiding pins 133 extend outwardly from a pair of diagonal corners of the middle flange 125, respectively. An upper coil 130 of the coils 122 is wound on an upper portion 128 of the periphery of the cylindrical-shaped stator core 121, which is formed between the top and middle flanges 126, 125. The upper coil 130 has two ends respectively wound on the guiding pins 133 and then connected with two of the connecting pins 139 of the base 123. A lower coil 131 of the coils 122 is wound on a lower portion 129 of the periphery of the cylindrical-shaped stator core 121, which is formed between the bottom and middle flanges 127, 125. The lower coil 131 has two ends respectively connected with the other two of the connecting pins 139 of the base 123. Four blocks 120 extend upwardly from an inner periphery of the four corners of the top flange 126.

Figure 4:
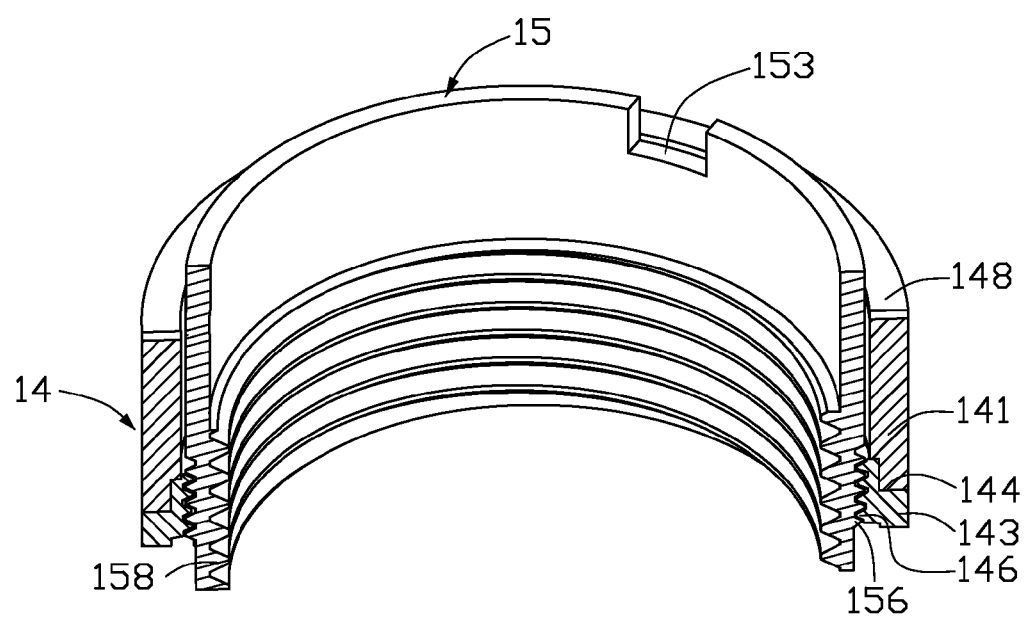
FIG. 4 is an isometric, cross-sectional view of a rotor assembled with a lens barrel of the auto-focusing camera of FIG. 1.

Referring to FIG. 4, the rotor 14 includes a permanent magnet 141 and a cylindrical-shaped shell 143 connected to a bottom end of the magnet 141. A layer 148 made of highly abrasion-resistant material, such as ceramic, is positioned to cover a top end of the magnet 141. The shell 143 forms an inner thread 146 on an inner surface thereof. The middle portion of the bracket 134 of the base 123 consisting of the annular flange 136 abuts against a bottom end of the shell 143 to support the rotor 14 thereon. The lens unit 20 is arranged on the inner portion 137 of the bracket 134 of the base 123 and is linearly movably received in the rotor 14. The lens unit 20 includes a lens barrel 15 and a lens 16 received in the lens barrel 15. The lens barrel 15 forms an outer thread 156 on an outer surface near a bottom end thereof, corresponding to the inner thread 146 of the shell 143 of the rotor 14. An internal thread 158 is formed in an inner surface of the lens barrel 15. An external thread 168 is formed in an outer surface of the lens 16 (also see FIG. 1). The lens 16 is received in the lens barrel 15 with the external thread 168 engaged with the internal thread 158 of the lens barrel 15. Two grooves 153 are defined in a top end of the lens barrel 15 of the lens unit 20. The grooves 153 are equidistantly spaced from each other along a circumferential direction of the lens barrel 15.

A cover 17 is mounted on the motor 100 with a through hole 175 defined in a central portion thereof for the lens unit 20 to extend therethrough. A ring 172 extends downwardly from the cover 17 around the through hole 175 and abuts against the top end of the rotor 14 to limit axial movement of the rotor 14. Two ears 173 extend radially and inwardly from an inner circumference of the ring 172 of the cover 17, corresponding to the grooves 153 of the lens barrel 15. Four mounting holes 171 are defined in the cover 17 around the through hole 175, corresponding to the blocks 120 of the stator 12. The four mounting holes 171 are equidistantly spaced from each other along a circumferential direction of the through hole 175. When the cover 17 is mounted on the motor 100, the blocks 120 of the stator 12 engages into the mounting holes 171 of the cover 17 to assemble the cover 17 and the motor 100 together.

Figure 5:
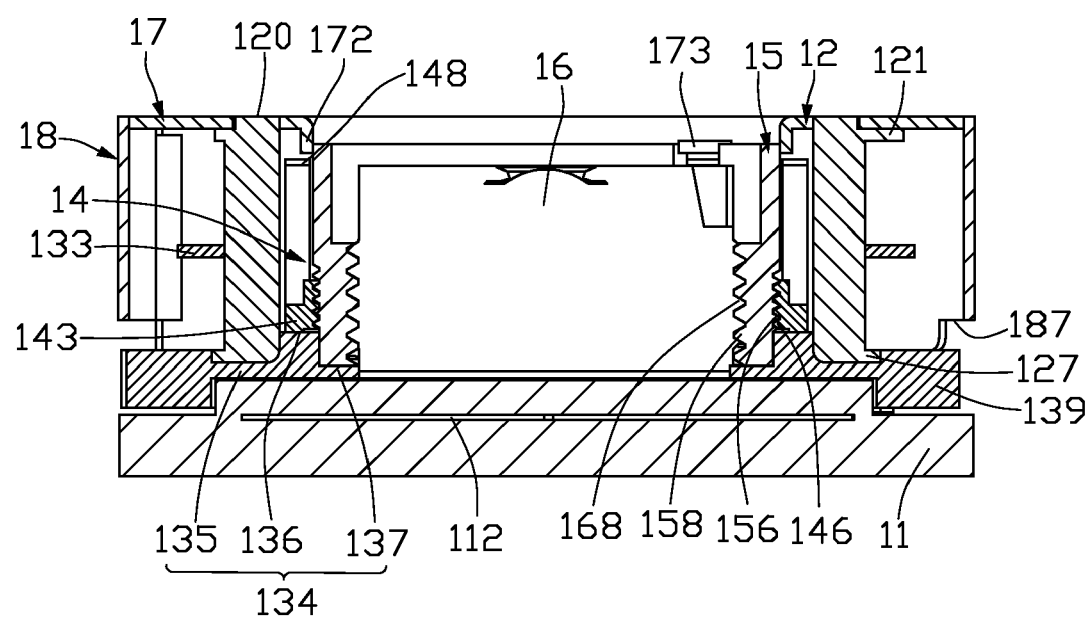
FIG. 5 shows a cross-sectional view of the auto-focusing camera of FIG. 3.

As shown in FIG. 5, when assembled, the motor 100 with the cover 17 arranged thereon is mounted on the circuit board 11, and the lens unit 20 is movably received in the hollow motor 100 with the outer thread 156 of the lens barrel 15 screwing on the inner thread 146 of the shell 143 of the rotor 14. The base 123 of the motor 100 is arranged on the circuit board 11 with the four connecting pins 139 thereof being respectively electrically connected with the contacts 114 of the circuit board 11. Thus the ends of the coils 122 are electrically connected with the circuit board 11 through the connecting pins 139. The two parts 181, 182 of the housing 18 are mounted around the motor 100 and assembled together. As the housing 18 being cuboid-shaped, the connecting pins 139 of the base 123 and the contacts 114 of the circuit board 11 are located inside the four corners of the housing 18. The ends of the coils 122 are connected with the circuit board 11 through the connecting pins 139 which are located in the housing 18 and electrically contact with the contacts 114; thus, wiring for electrically connecting the coils 122 and the contacts 114 is no longer needed in the present invention. The housing 18 is constructed by two parts 181, 182, and can be assembled after the motor 100 and the lens unit 20 are mounted on the circuit board 11. The coils 122 can be connected to the connecting pins 139 conveniently and accurately, and the motor 100 is thus assembled easily. Also the housing 18 can be assembled firstly, and then mounting the motor 100 and the lens unit 20 into the housing 18.

Figure 6:
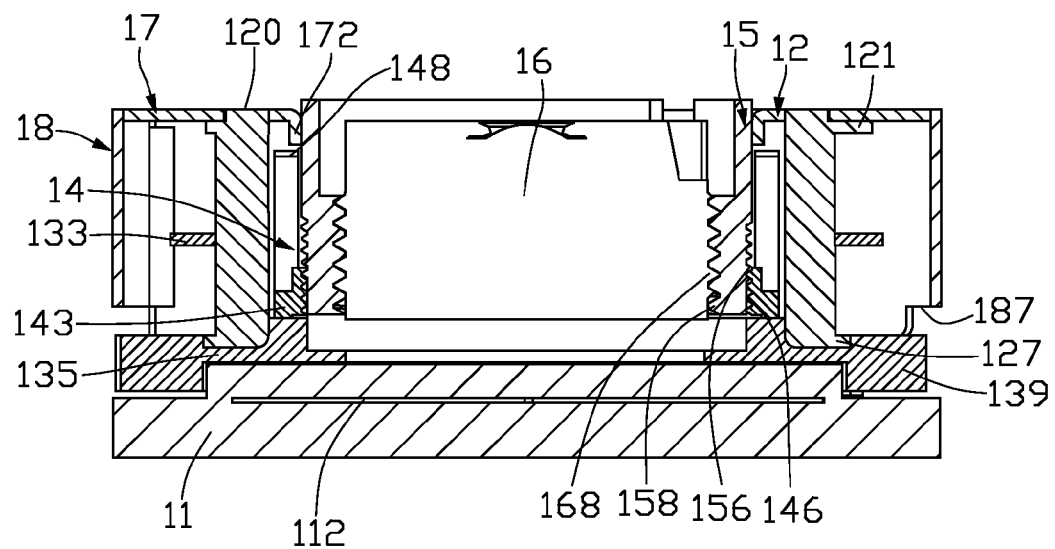
FIG. 6 is similar to FIG. 5, but showing that a lens of the auto-focusing camera is extended.

Referring to FIGS. 5-6, during operation, a current is applied to the coils 122 of the motor 100 through the circuit board 11. The rotor 14 is driven to rotate by the interaction of the alternating magnetic field established by the stator 12 and the magnetic field of the rotor 14. The rotation of the rotor 14 then turns to an axial telescopic movement of the lens unit 20 through the interaction between the inner thread 146 of the rotor 14 and the outer thread 156 of the lens barrel 15 and through the interaction between the ears 173 and the grooves 153. Therefore the motor 100 acts as a stepper motor 100 to drive the lens unit 20 into telescopic movement along the axial direction of the lens unit 20. For the external and internal thread 168, 158 respectively formed on the lens 16 and the lens barrel 15, the lens 16 can be easily and precisely assembled in a required initial position by adjusting relative position of the lens 16 relative to the lens barrel 15 when the lens 16 is screwed in the lens barrel 15 to form the lens unit 20. Furthermore, the ears 173 of the cover 17 engage into the grooves 153 of the lens barrel 15 to avoid swing of the lens unit 20, and thus to guide the axial movement of the lens unit 20. Thus, a stable and precise axial movement of the lens unit 20 can be obtained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auto-focus camera comprising:
   a square-shaped circuit board having contacts formed on corners thereof;
   a motor arranged on the circuit board, comprising:
      a cuboid-shaped housing being mounted on the circuit board, the contacts of the circuit board being located within the housing;
      a stator mounted in the housing, comprising a square-shaped base forming connecting pins in corners thereof, and a stator core with coils wound thereon, the coils having ends being electrically connected with the connecting pins of the base, the connecting pins being electrically connected with the contacts of the circuit board to electrically connect the ends of the coils to the circuit board; and
      a rotor being rotatably disposed in the stator, the rotor having an inner thread formed on an inner surface thereof; and
   a lens unit being linearly movably received in the rotor, the lens unit having an outer thread formed thereon and engaging with the inner thread of the rotor.

2. The auto-focus camera of claim 1, wherein the housing comprises two parts assembled together.

3. The auto-focus camera of claim 2, wherein the two parts lock with each other to assemble together.

4. The auto-focus camera of claim 2, wherein the two parts of the housing are assembled together by laser soldering.

5. The auto-focus camera of claim 1, wherein each corner of the housing defines a cutout in a bottom end thereof corresponding to one of the connecting pins of the base.

6. The auto-focus camera of claim 1, wherein the lens unit comprises a lens barrel and a lens mounted in the lens barrel, the lens barrel forming the outer thread of the lens unit on an outer surface thereof, an internal thread being formed on an inner surface of the lens barrel, and the lens forming an external thread on an outer surface thereof, the external thread of the lens engaging with the internal thread of the lens barrel.

7. The auto-focus camera of claim 1, further comprising a cover mounted on the motor with a through hole defined in a central portion thereof for extension of the lens unit therethrough, the cover having several ears extending radially and inwardly from an inner circumference thereof, the lens unit defining several grooves receiving the ears therein, thereby guiding the linear movement of the lens unit in the rotor.

8. The auto-focus camera of claim 7, wherein the cover defines a plurality of slots therein, and the stator of the motor forms a plurality of protrusions on a top end thereof, the protrusions being engaged into the slots.

9. The auto-focus camera of claim 1, wherein the stator core has two coils wound thereon, a flange extending from the stator core between the two coils, a pair of guiding pins are formed on the flange for guiding the ends of the coils to connect with the connecting pins of the base.

10. An auto-focusing camera comprising:
    a printed circuit board;
    a motor mounted on the printed circuit board, comprising:
       a stator having a square-shaped base having four connecting pins on four corners thereof, respectively, the four connecting pins electrically connecting with the printed circuit board, coils wound around a periphery of a stator core of the stator, a pair of guiding pins formed on two opposite sides of the stator core, respectively, wherein ends of the coils extend through the guiding pins to electrically connect with the connecting pins; and
       a rotor rotatably mounted in the stator core of the stator, wherein when the coils are energized by the printed circuit board, the rotor rotates in the stator core; and
    a lens unit mounted in the rotor, wherein when the rotor rotates, the lens unit has a telescopic movement relative to the rotor.

11. The auto-focusing camera of claim 10 further comprising a cuboid-shaped housing enclosing the printed circuit board, the motor and the lens unit therein.

* * * * *